Dec. 4, 1956  F. A. BALLOU, JR  2,772,472
ATTACHMENT OF PIN STEM FINDING TO AN ORNAMENT
Filed June 24, 1954

*INVENTOR.*
FREDERICK A. BALLOU, JR.
BY
*Barlow & Barlow*
ATTORNEYS

United States Patent Office 2,772,472
Patented Dec. 4, 1956

2,772,472
ATTACHMENT OF PIN STEM FINDING TO AN ORNAMENT

Frederick A. Ballou, Jr., Providence, R. I., assignor to B. A. Ballou & Co. Incorporated, a corporation of Rhode Island Application June 24, 1954, Serial No. 439,029

1 Claim. (Cl. 29—160.6)

This invention relates to the attachment of a pin stem finding, such for instance as a joint or catch, to the base of a bar or ornament upon which it is intended to be positioned.

Heretofore it has been usual to attach a pin stem finding, such for instance as a joint or catch, to the ornament upon which it was to be positioned by soldering the base to the ornament. In some instances, particularly with certain metals, it is desirable to attach the findings without the use of heat and consequently without solder.

One of the objects of this invention is to provide a means by which the pin stem finding may be physically attached to the ornament upon which it is to be positioned without the use of solder and without the use of heat.

Another object of this invention is to provide an arrangement so that when the pin stem finding is positioned, it will be in proper alignment for the operation of the pin stem.

Another object of the invention is to provide a method of attachment which will be relatively inexpensive and quick of application.

Another object of the invention is to provide a method of attachment which will eliminate necessity of the employment of highly skilled solderers for positioning the pin stem joint or catch in position.

With these and other objects in view, this invention consists of certain novel features of construction as will be more fully described and particularly pointed out in the appended claim.

In proceeding with this invention, I strike a recess in the back of the ornament to which the pin stem finding is to be attached in such a way that the outer periphery of the recess is raised above the normal plane of the back of the ornament. A pin stem finding which may be either a pin stem joint or a catch is provided which has a large base which tapers upwardly something along the line of a frustro cone. This base is located in the recess which is of a depth so that the portion of the finding which is to be outwardly of the rear surface of the ornament is in its proper location. A staking tool which consists of a tubular member with its inner surface outwardly flared is then forced downwardly about the pin stem finding so that the raised portion of the stock and the walls of the recess are driven inwardly about the pin stem finding base so as to secure it firmly in position.

Figure 1:
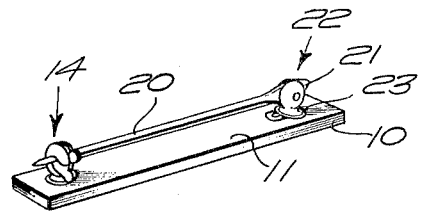
Figure 1 is a perspective view of the rear surface of an ornamental bar with a pin stem joint and catch attached thereto.
Figure 2:
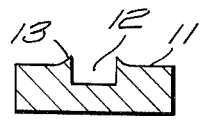
Figure 2 is a sectional view showing the first step in providing the bar for the attachment.
Figure 3:
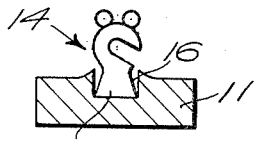
Figure 3 shows the pin stem finding inserted in the recess shown in Figure 2.
Figure 4:
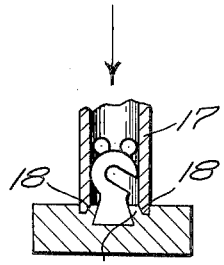
Figure 4 is a sectional view similar to Figure 3 but showing a staking tool as closing the walls of the recess over the pin stem finding.
Figure 5:
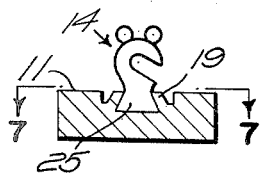
Figure 5 is a view similar to Figure 4 but showing the staking tool removed.
Figure 6:
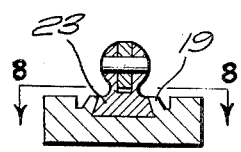
Figure 6 is a sectional view similar to Figure 5 but showing the joint as distinguished from the catch shown in Figures 3, 4, and 5 illustrating the final operation of securing the joint in place similar to the securing of the catch in place.
Figure 7:
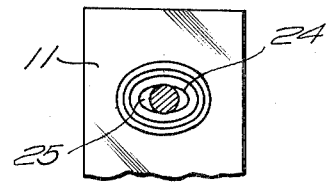
Figure 7 is a plan view showing an out of round recess and pin stem finding positioned therein.
Figure 8:
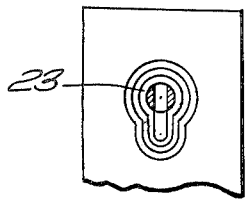
Figure 8 is a view similar to Figure 7 but showing a pear-shaped recess as distinguished from an oval recess as shown in Figure 7 and a pin stem joint as secured therein.

With reference to the drawings, 10 designates an ornament which is shown in bar form having a rear surface 11. This rear surface 11 is struck to provide a recess 12 which in such striking will cause the rear peripheral edge of the recess 13 to be raised as shown in Figure 2. The safety catch or other pin stem finding designated generally 14 is provided with a large base 15 with its side walls frustro conical in shape as at 16, as shown in Figures 3 to 5. It is then positioned with its lower surface against the bottom surface of the recess 12, as in Figure 3. In the next operation a staking tool designated 17 and which is tubular in shape with its lower surface tapered as at 18 is then brought down over the pin stem finding and struck so that the stock as at 19 is forced inwardly about the frustro conical wall 16 of the base so as to hold the base of the finding securely in position.

It is desirable that the pin stem be so arranged that the stem portion 20 will extend toward the catch 14 and the stop 21 will also be properly located, and thus the pin stem joint designated generally 22 is provided with a pear-shaped base 23 so that one location alone may be obtained when the base is positioned in the correspondingly shaped recess in the back surface 11 of the bar or ornament.

In the case of the catch shown at 14, the recess in the back wall may be oval shaped as shown at 24, and the base may also be oval shaped as at 25 so that this may be positioned for either right-hand or left-hand reception of the stem 20 as occasion may require. In both cases, however, there will be a proper alignment of the joint as well as the catch so that the pin stem 20 will have proper engagement when the attachment is made.

The above means of attachment is particularly desirable where aluminum is provided, and it has been found that aluminum such as that which is anodized is well adapted for use in jewelry.

I claim:

The method of connecting without heat pin stem findings to an ornament comprising providing each of two co-operating findings with an out of round base of a size larger than the pin stem engaging part thereof, recessing said ornament at two locations in a shape corresponding to the shape of said base with said recesses oriented to align said findings bases for cooperation with each other for functioning together, positioning said bases of said findings in said recesses, and staking the stock about the recesses over the outer surface of the finding bases.

References Cited in the file of this patent

UNITED STATES PATENTS

| | | |
|---|---|---|
| 1,610,664 | Ellison | Dec. 14, 1926 |
| 1,827,884 | Ellison | Oct. 20, 1931 |
| 1,928,443 | Archer et al. | Sept. 26, 1933 |
| 2,491,166 | Distiso | Dec. 13, 1949 |